US012336562B2

(12) United States Patent
Talbot et al.

(10) Patent No.: US 12,336,562 B2
(45) Date of Patent: Jun. 24, 2025

(54) SMOKING SUBSTITUTE DEVICE HAVING AN AUXILIARY POWER SUPPLY

(71) Applicant: Imperial Tobacco Limited, Bristol (GB)

(72) Inventors: Oliver Talbot, Liverpool (GB); Chris Lord, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 334 days.

(21) Appl. No.: 17/701,358

(22) Filed: Mar. 22, 2022

(65) Prior Publication Data

US 2022/0211100 A1     Jul. 7, 2022

Related U.S. Application Data

(63) Continuation of application No. PCT/EP2020/076967, filed on Sep. 25, 2020.

(30) Foreign Application Priority Data

Sep. 25, 2019   (EP) .................................... 19199677

(51) Int. Cl.
*A24F 40/60*   (2020.01)
*A24F 40/10*   (2020.01)
*A24F 40/40*   (2020.01)
*A24F 40/44*   (2020.01)
*A24F 40/46*   (2020.01)
(Continued)

(52) U.S. Cl.
CPC .............. *A24F 40/10* (2020.01); *A24F 40/44* (2020.01); *A24F 40/46* (2020.01); *H04M 1/72409* (2021.01)

(58) Field of Classification Search
CPC .......... A24F 40/10; A24F 40/44; A24F 40/46; A24F 40/90; H02J 7/0042; H04M 1/72409
See application file for complete search history.

(56) References Cited

U.S. PATENT DOCUMENTS 11,771,141 B2 * 10/2023 Talbot .................... A24F 40/53
                                                  131/329
11,871,798 B2 *  1/2024 Fard ................. H04M 1/72412
(Continued)

FOREIGN PATENT DOCUMENTS

CN      106 666 828 A    5/2017
EP      3 170 414 A1     5/2017
(Continued)

OTHER PUBLICATIONS

International Search Report and Written Opinion (PCT/EP2020/076967), dated Nov. 13, 2020, 13 pages.
(Continued)

*Primary Examiner* — Abdullah A Riyami
*Assistant Examiner* — Thang H Nguyen
(74) *Attorney, Agent, or Firm* — DUNLAP CODDING, P.C.

(57) ABSTRACT

Disclosed is a smoking substitute system comprising a connector configured to receive a main power supply from a mobile device and to supply the main power supply to a vaporizer. The system further comprises an auxiliary power source configured to provide an auxiliary power supply to the vaporizer and/or at least one auxiliary component of the smoking substitute system.

12 Claims, 3 Drawing Sheets

(51) Int. Cl.
    *A24F 40/90*     (2020.01)
    *H04M 1/72409*     (2021.01)

(56) References Cited

U.S. PATENT DOCUMENTS

| | | | |
|---|---|---|---|
| 11,962,713 B2* | 4/2024 | Fard | A24F 40/65 |
| 2013/0087160 A1 | 4/2013 | Gherghe | |
| 2016/0331035 A1* | 11/2016 | Cameron | H04M 1/21 |
| 2016/0345628 A1* | 12/2016 | Sabet | H04M 1/21 |
| 2017/0360090 A1* | 12/2017 | Grossfeld | H04M 1/72409 |
| 2019/0001096 A1 | 1/2019 | Pratt, Jr. et al. | |
| 2019/0281893 A1* | 9/2019 | Valdez-Gibson | A24F 40/00 |
| 2020/0022414 A1* | 1/2020 | Leeds | H02J 7/0013 |
| 2020/0305506 A1* | 10/2020 | Borkovec | A24F 40/65 |

FOREIGN PATENT DOCUMENTS

| | | | | |
|---|---|---|---|---|
| WO | WO 2015/010787 A1 | 1/2015 | | |
| WO | WO-2017084920 A2 * | 5/2017 | | A24F 40/40 |
| WO | WO 2017/133870 | 8/2017 | | |

OTHER PUBLICATIONS

International Search Report (19199677.6-1004), dated Mar. 30, 2020, 8 pages.

* cited by examiner

SMOKING SUBSTITUTE DEVICE HAVING AN AUXILIARY POWER SUPPLY

CROSS-REFERENCE TO RELATED APPLICATIONS/INCORPORATION BY REFERENCE STATEMENT

This application is a non-provisional application claiming benefit to the international application no. PCT/EP2020/076967 filed on Sep. 25, 2020, which claims priority to EP 19199677.6 filed on Sep. 25, 2019. The entire contents of each of the above-referenced applications are hereby incorporated herein by reference in their entirety.

FIELD OF THE DISCLOSURE

The present disclosure relates to a smoking substitute device and more particularly, but not exclusively, a smoking substitute device including a vaporizer of the type that comprises a wick and a heating filament.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices, which may also be known as electronic nicotine delivery systems, may comprise electronic systems that permit a user to simulate the act of smoking by producing an aerosol, also referred to as a "vapor", which is drawn into the lungs through the mouth (inhaled) and then exhaled. The inhaled aerosol typically bears nicotine and/or flavorings without, or with fewer of, the odor and health risks associated with traditional smoking.

In general, smoking substitute devices are intended to provide a substitute for the rituals of smoking, whilst providing the user with a similar experience and satisfaction to those experienced with traditional smoking and tobacco products.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilizing a different smoking substitute approach. A smoking substitute approach corresponds to the manner in which the substitute system operates for a user.

One approach for a smoking substitute device is the so-called "vaping" approach, in which a vaporizable liquid, typically referred to (and referred to herein) as "e-liquid", is heated by a heater to produce an aerosol vapor which is inhaled by a user. An e-liquid typically includes a base liquid as well as nicotine and/or flavorings. The resulting vapor therefore typically contains nicotine and/or flavorings. The base liquid may include propylene glycol and/or vegetable glycerin.

A typical vaping smoking substitute device includes a mouthpiece, a power source (typically a battery), a tank or liquid reservoir for containing e-liquid, as well as a heater. In use, electrical energy is supplied from the power source to the heater, which heats the e-liquid to produce an aerosol (or "vapor") which is inhaled by a user through the mouthpiece.

Vaping smoking substitute devices can be configured in a variety of ways. For example, there are "closed system" vaping smoking substitute devices which typically have a heater and a sealed tank which is pre-filled with e-liquid and is not intended to be refilled by an end user. One subset of closed system vaping smoking substitute devices include a main body which includes the power source, wherein the main body is configured to be physically and electrically coupled to a consumable including the tank and the heater. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the myblu™ e-cigarette. The myblu™ e cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a vaporizer, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the vaporizer, which heats e-liquid from the tank to produce a vapor which is inhaled by a user through the mouthpiece.

Another example vaping smoking substitute device is the blu PRO™ e-cigarette. The blu PRO™ e cigarette is an open system device which includes a main body, a (refillable) tank, and a mouthpiece. The main body and tank are physically and electrically coupled together by screwing one to the other. The mouthpiece and refillable tank are physically coupled together by screwing one into the other, and detaching the mouthpiece from the refillable tank allows the tank to be refilled with e-liquid. The device is activated by a button on the main body. When the device is activated, electrical energy is supplied from the power source to a vaporizer, which heats e-liquid from the tank to produce a vapor which is inhaled by a user through the mouthpiece.

In smoking substitute device the power source (e.g., battery) can make up a large proportion of the weight and/or size of the device. This may reduce the portability of the device. Thus, there may be a need for improved design of smoking substitute devices, The present disclosure has been devised in the light of the above considerations.

SUMMARY OF THE DISCLOSURE

At its most general, the present disclosure relates to smoking substitute system configured to receive power from a mobile device and comprising an auxiliary power source to supplement the power received from the mobile device.

According to a first aspect there is provided a smoking substitute system comprising:

a connector configured to receive a main power supply from a mobile device and to supply the main power supply to a vaporizer; and an auxiliary power source configured to provide an auxiliary power supply to the vaporizer and/or at least one auxiliary component of the smoking substitute system.

The ability to receive a main power supply from a mobile device may reduce the size and/or weight of the power source provided as part of the smoking substitute system (i.e., in this case the auxiliary power source). Thus, the smoking substitute system may have increased portability. The provision of both a main power supply from a mobile device and an auxiliary power supply may allow full operation of the smoking substitute system, even when the main power supply from a mobile device does not meet the full power requirements of the smoking substitute system.

Optional features will now be set out. These are applicable singly or in any combination with any aspect.

The auxiliary power source may be configured to be connected to (or connectable to) the vaporizer for supplying power to the vaporizer (e.g., by applying a voltage across a heating element of the vaporizer). In this respect, the auxiliary power supply may supplement the main power supply provided to the vaporizer. That is, the auxiliary power source may be configured to amplify the current supplied to the vaporizer by the mobile device (i.e., via the connector). This may, for example, allow the vaporizer (i.e., a heating element of the vaporizer) to more rapidly increase in temperature (i.e., than would be the case if only the main power supply were provided to the heating element). In such embodiments, the system may be configured such that the power supplied from the mobile device (the main power supply) is greater than the power supplied from the auxiliary power source (the auxiliary power supply).

The system may comprise a vaporizer for vaporizing an aerosol precursor. The vaporizer may comprise a wick in fluid communication with the aerosol precursor, and a heating filament for heating the wick (i.e., the heating element of the vaporizer is a heating filament). The heating filament may be coiled about the wick. The connector may be electrically connected to the heating element/filament of the vaporizer. The auxiliary power source may be electrically connected to the heating element/filament of the vaporizer.

In other embodiments the auxiliary power source may not be configured for connection to (i.e., may be unconnected from) the heating element/filament.

In some embodiments, the auxiliary power source may be connected to one or more auxiliary components of the smoking substitute system to supply power to the auxiliary component(s). The one or more auxiliary components may include a light (e.g., LED) of the smoking substitute system. The light/LED may, for example, indicate an operating condition of the smoking substitute system.

The one or more auxiliary components may be a controller configured to control the operation of the smoking substitute system. For example, the controller may be configured to control the main power supply to the vaporizer/heating element/heating filament. Alternatively, or additionally, the controller may be configured to control the auxiliary power supply to the vaporizer/heating element/heating filament and/or the one or more auxiliary components. In some embodiments, the controller may be configured to detect whether the main power supply provided from the connector is sufficient (e.g., meets a threshold power value) and in response may control the smoking substitute system so as to supplement the main power supply with the auxiliary power supply from the auxiliary power source. The controller may, for example, control one or more relays or switches for allowing or preventing power supply to the vaporizer/heating element/heating filament.

The smoking substitute system may comprise a memory, which may be operatively connected to the controller. The memory may include non-volatile memory. The memory may include instructions which, when implemented, cause the controller to perform certain tasks or steps of a method.

An airflow (i.e., puff) sensor may be provided that is configured to detect a puff (i.e., inhalation from a user). The airflow sensor may be operatively connected to the controller so as to be able to provide a signal to the controller that is indicative of a puff state (i.e., puffing or not puffing) of the smoking substitute system. The airflow sensor may, for example, be in the form of a pressure sensor or an acoustic sensor. The controller may control power supply (i.e., auxiliary and/or main power supply) to the vaporizer/heating element/heating filament in response to airflow detection by the sensor. The control may be in the form of activation of the vaporizer/heating element/heating filament in response to a detected airflow.

The auxiliary power source may be a battery (or cell). The auxiliary power source may be a supercapacitor. The auxiliary power source may have a capacity of less than 150 mAh, or, e.g., less than 150 mAh. This may minimize the size and/or weight of the auxiliary power source. The auxiliary power source may be configured to supply a voltage of between 2.5V and 4.5V. The auxiliary power source may, for example be configured to supply a voltage of between 3.5V and 4V (e.g., about 3.7V). The auxiliary power source may have a maximum discharge current capability of less than 0.7 A, or, e.g., less than, e.g., 0.5 A.

The auxiliary power source may be rechargeable. The auxiliary power source may, for example, be rechargeable by the main power supply. At least a portion of the main power supply may be diverted to the auxiliary power source. The controller may control the main power supply so as to be supplied to the auxiliary power source (for recharging) when the vaporizer (e.g., heating element/filament) is in an inactive (i.e., non-heating) state.

The connector may comprise a port for connection to the mobile device. The port may, for example, be a USB port. The port may, e.g., by a USB-C port. The connector (and/or vaporizer/heating element/filament) may be configured to receive a main power supply from the mobile device that is greater than 2.5 W.

The smoking substitute system may comprise a passage for fluid flow therethrough. The passage may extend through (at least a portion of) the smoking substitute system, between openings that may define an inlet and an outlet of the passage. The outlet may be at a mouthpiece of the smoking substitute system. In this respect, a user may draw fluid (e.g., air) into and through the passage by inhaling at the outlet (i.e., using the mouthpiece).

The smoking substitute system may comprise a tank (reservoir) for containing the aerosol precursor (e.g., which may be an e-liquid). The e-liquid may, for example, comprise a base liquid and, e.g., nicotine. The base liquid may include propylene glycol and/or vegetable glycerin.

The tank may be defined by a tank housing. At least a portion of the tank housing may be translucent. For example, the tank housing may comprise a window to allow a user to visually assess the quantity of e-liquid in the tank. The tank may be referred to as a "clearomizer" if it includes a window, or a "cartomizer" if it does not. The passage may extend longitudinally within the tank and a passage wall may define the inner wall of the tank. In this respect, the tank may surround the passage, e.g., the tank may be annular. The passage wall may comprise longitudinal ribs extending therealong. These ribs may provide support to the passage wall. The ribs may extend for the full length of the passage wall. The ribs may project (e.g., radially outwardly) into the tank.

The wick of the vaporizer may comprise a porous material. A portion of the wick may be exposed to fluid flow in the passage. As is provided above the wick is in fluid communication with the aerosol precursor. Thus, the wick may comprise one or more portions in contact with aerosol-precursor (e.g., e-liquid) stored in the reservoir. For example, opposing ends of the wick may protrude into the reservoir and a central portion (between the ends) may extend across the passage so as to be exposed to fluid flow in the passage. Thus, fluid may be drawn (e.g., by capillary action) along the wick, from the reservoir to the exposed portion of the wick.

The heating filament may be wound about the wick (e.g., the filament may extend helically about the wick). The filament may be wound about the exposed portion of the wick. The main power supply (and optionally auxiliary power supply) may heat the heating element so as to cause aerosol precursor stored in the wick (i.e., drawn from the tank) to be heated. The heated aerosol precursor may form a vapor that becomes entrained in fluid flowing through the passage. This vapor may subsequently cool to form an aerosol in the passage.

The system may comprise a device and a consumable that are connectable (i.e., electrically and mechanically) with one another. The connector and the auxiliary power source may form part of the device. The vaporizer, tank and passage as described above may form part of the consumable. In general, the consumable may comprise components of the system that are disposable, and the device may comprise non-disposable or non-consumable components. In such an embodiment, the aerosol precursor (e.g., inside the tank) may be replenished by replacing a used consumable with a replacement (unused) consumable.

The device and the consumable may be configured to be physically coupled together. For example, the consumable may be at least partially received in a recess of the device, such that there is snap engagement between the device and the consumable. Alternatively, the device and the consumable may be physically coupled together by screwing one onto the other, or through a bayonet fitting.

Thus, the consumable may comprise one or more engagement portions for engaging with the device. In this way, one end of the consumable (i.e., the inlet end) may be coupled with the device, whilst an opposing end (i.e., the outlet end) of the consumable may define a mouthpiece.

The consumable may comprise an electrical interface for interfacing with a corresponding electrical interface of the device. One or both of the electrical interfaces may include one or more electrical contacts. Thus, when the device is engaged with the consumable (and is additionally connected to a mobile device), the electrical interface may be configured to transfer electrical power from the mobile device (and optionally the auxiliary power source) to the vaporizer/heating element/filament of the consumable.

The device may alternatively or additionally be able to detect information about the consumable via an RFID reader, a barcode or QR code reader. This interface may be able to identify a characteristic (e.g., a type) of the consumable. In this respect, the consumable may include any one or more of an RFID chip, a barcode or QR code, or memory within which is an identifier and which can be interrogated via the interface.

In other embodiments, the tank of the substitute smoking system may be refillable. In such embodiments the above described components may all form part of a smoking substitute device, and the system may not include a consumable.

The system may further comprise mobile device for providing the main power supply to the smoking substitute device.

The mobile device may be a mobile telecommunications device (e.g., a mobile phone or a tablet).

The system may further comprise a cable for connecting the connector of the system to the mobile device. The cable may be a USB cable, e.g., a USB-C cable.

In a second aspect there is provided a method of using a smoking substitute system as described above with respect to the first aspect, the method comprising connecting the mobile device to the vaporizer (e.g., heating element/filament) via the connector so as to supply power to the vaporizer/heating element/filament, and additionally supplying power to one or more components of the smoking substitute system from the auxiliary power source of the smoking substitute system.

The disclosure includes the combination of the aspects and preferred features described except where such a combination is clearly impermissible or expressly avoided.

BRIEF DESCRIPTION OF THE FIGURES

So that the disclosure may be understood, and so that further aspects and features thereof may be appreciated, embodiments illustrating the principles of the disclosure will now be discussed in further detail with reference to the accompanying figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

Figure 1:
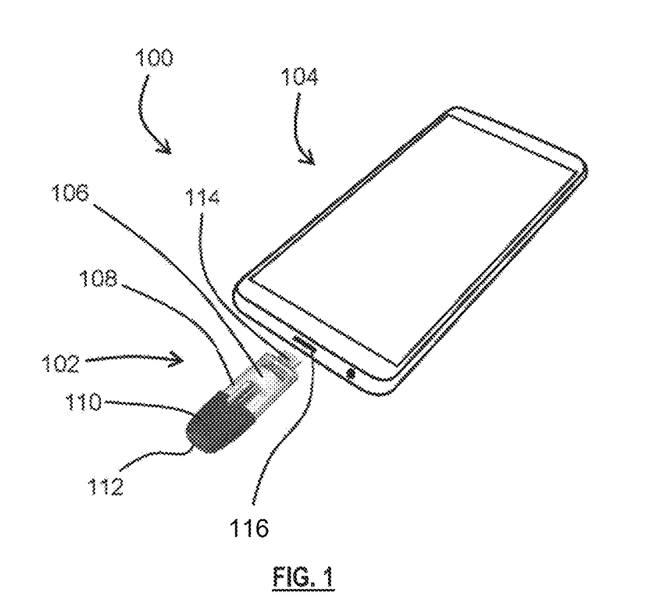
FIG. 1 is a perspective of a first embodiment of a smoking substitute system.

FIG. 1 shows a first embodiment of a smoking substitute system 100. The smoking substitute system 100 includes a smoking substitute device 102 and a mobile device in the form of a mobile phone 104. The smoking substitute device 102 may alternatively be referred to as a "pod", "cartridge" or "cartomizer".

The smoking substitute device 102 comprises a vaporizer 106 for vaporizing an aerosol precursor, in the form of an e-liquid, stored in a tank 108 of the smoking substitute device 102. The tank 108 is transparent such that the amount of e-liquid stored in the tank 108 can be visually assessed.

Whilst not apparent from FIG. 1, the vaporizer 106 comprises a wick in fluid communication with the aerosol precursor in the tank 108, and a heating filament for heating the wick (and aerosol precursor held in the wick). The smoking substitute device 102 comprises a mouthpiece 110 with an outlet 112 in fluid communication with the vaporizer 106. In this way, a user can draw on the mouthpiece 110 so as to draw air through the vaporizer 106, such that vapor (produced by the vaporizer 106) becomes entrained in the airflow and can be inhaled by the user.

The smoking substitute device 102 further comprise a connector 114 configured to receive a main power supply from the mobile phone 104. The connector 114 is configured to supply the main power supply, received from the mobile phone 104, to the heating filament of the vaporizer 106. In the illustrated embodiment, the connector 114 is in the form of a USB-C connector for engagement (and operative connection with) a USB-C port 116 of the mobile phone 104. It should, however, be appreciated that the connector 114 may take other forms for connection to other types of ports.

As will be described in further detail below the smoking substitute device 102 comprises an auxiliary power source (not shown in FIG. 1) configured to provide an auxiliary power supply to components of the smoking substitute device 102.

Figure 2:
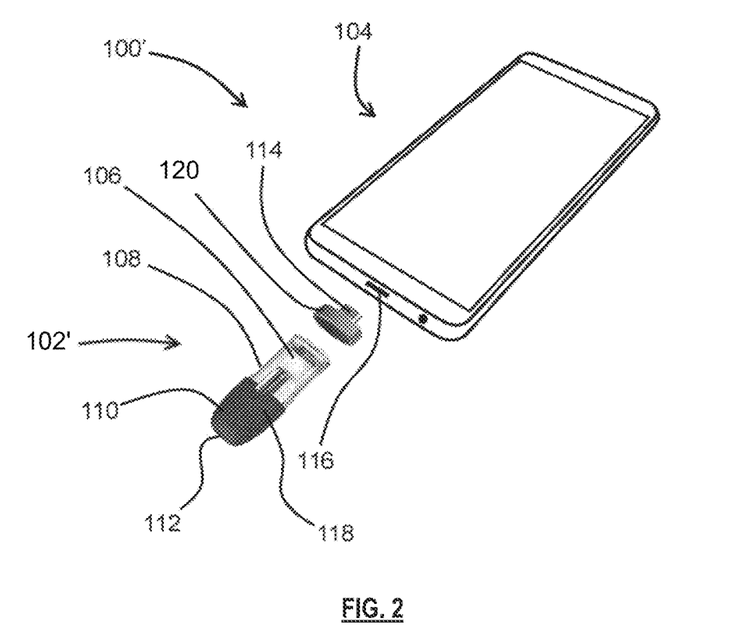
FIG. 2 is a perspective of a second embodiment of a smoking substitute system.

FIG. 2 shows a second embodiment of a smoking substitute system 100'. This system 100' comprises a mobile phone 104, a smoking substitute device 102' and a consumable 118. Together, the smoking substitute device 102' and consumable 118 comprise the same components as the smoking substitute device 102 described in the first embodiment (in FIG. 1). In particular, the consumable 118 comprises the tank 108 and the vaporizer 106, whilst the adapter portion 120 comprises the connector 114 (and the auxiliary power source, which is not shown).

The consumable 118 and smoking substitute device 102' are mechanically and electrically connectable, such that when engaged with one another, the main power supply received by connector 114 (from the mobile phone 104) is able to be supplied to the vaporizer 106.

In this second embodiment, the consumable 118 may be disengaged and replaced (with a replacement consumable portion) upon depletion of the aerosol precursor contained in the tank 108.

Figure 3A:
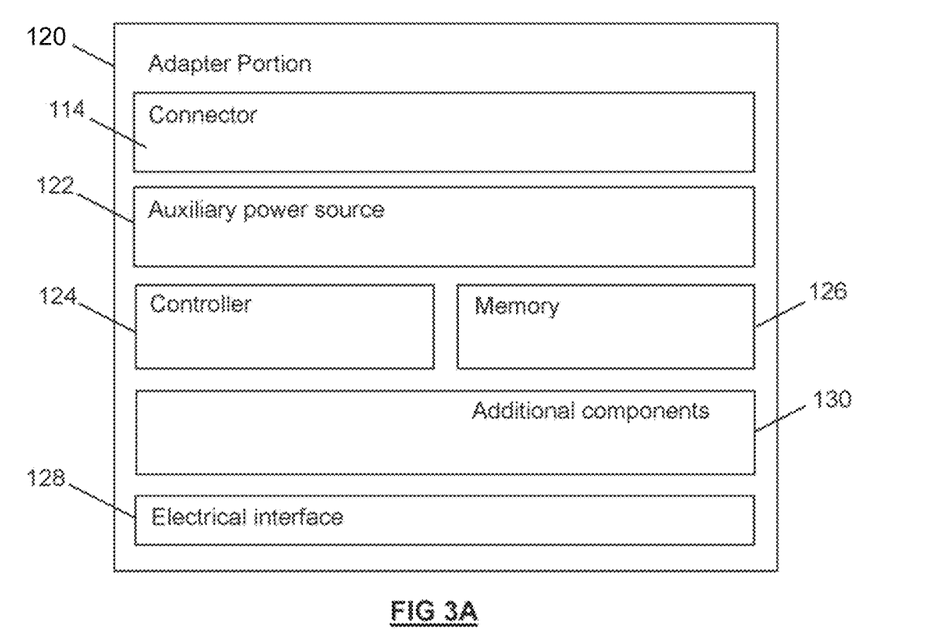
FIG. 3A is a schematic of a device of the second embodiment.
Figure 3B:
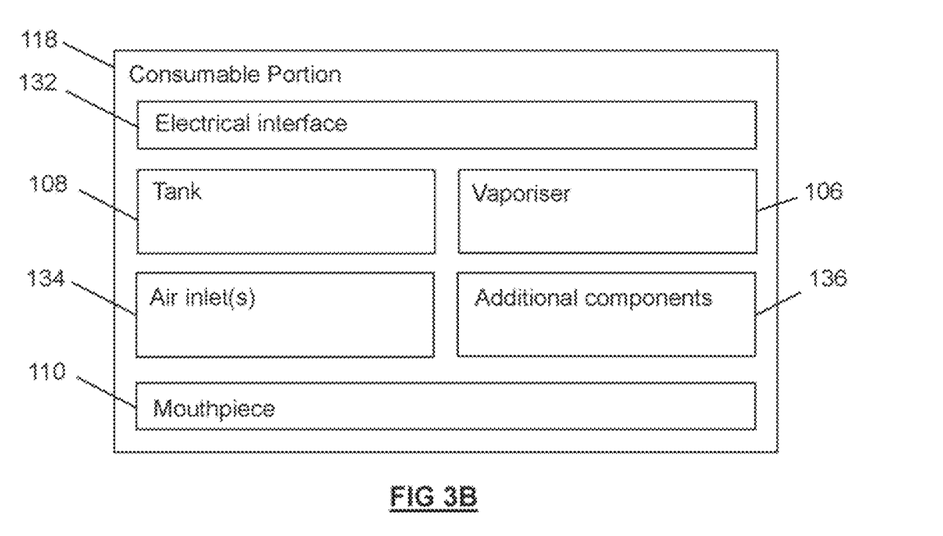
FIG. 3B is a schematic of a consumable of the second embodiment.

FIGS. 3A and 3B are schematic drawings of the consumable portion 118 and smoking substitute device 102' of the embodiment shown in FIG. 2. As is apparent from FIG. 3A, the smoking substitute device 102' includes a connector 114, an auxiliary power source 122, a controller 124, a memory 126, an electrical interface 128, and, optionally, one or more additional components 130.

The auxiliary power source 122 is preferably a battery, more preferably a rechargeable battery. The controller 124 may include a microprocessor, for example. The memory 126 preferably includes non-volatile memory. The memory 126 may include instructions which, when implemented, cause the controller 124 to perform certain tasks or steps of a method.

The electrical interface 128 of the smoking substitute device 102' may include one or more electrical contacts. The electrical interface 128 may be on a surface of the smoking substitute device 102' that opposes the surface from which the connector 114 extends. When the device 102' is physically coupled to the consumable 118, the electrical interface 128 is configured to transfer electrical power received from the mobile phone 104 to the consumable 118 (i.e., upon activation of the system 100').

The electrical interface 128 may also be used to identify the consumable 118 from a list of known consumables. For example, the consumable 118 may contain an e-liquid of a particular flavor and/or have a certain concentration of nicotine (which may be identified by the electrical interface 128). This can be indicated to the controller 124 of the smoking substitute device 102' when the consumable 118 is connected to the smoking substitute device 102'.

The additional components 130 of the smoking substitute device 102' may comprise an indicator, such as an LED. The LED may, in response to a signal from the controller 124, indicate a state or condition of the system 100'.

The additional components 130 of the smoking substitute device 102' may, if the auxiliary power source 122 is a rechargeable battery, include a battery charging control circuit, for controlling the charging of the rechargeable battery.

The additional components 130 of the smoking substitute device 102' may include a sensor, such as an airflow (i.e., puff) sensor for detecting airflow in the system 100', e.g., caused by a user inhaling through a mouthpiece 110 of the consumable 118. The vaporizer 106 of the system 100' may be configured to be activated when airflow is detected by the airflow sensor. This sensor could alternatively be included in the consumable 118. The airflow sensor can be used to determine, for example, how heavily a user draws on the mouthpiece 110 or how many times a user draws on the mouthpiece 110 in a particular time period.

The additional components 130 of the smoking substitute device 102' may include a user input, e.g., a button. The system 100' may be configured to be activated when a user interacts with the user input (e.g., presses the button). This provides an alternative to the airflow sensor as a mechanism for activating the system 100'.

As shown in FIG. 3B, the consumable 118 includes the tank 108, an electrical interface 132, the vaporizer 106, one or more air inlets 134, a mouthpiece 110, and one or more additional components 136.

The electrical interface 132 of the consumable 118 may include one or more electrical contacts. The electrical interface 132 of the smoking substitute device 102' and the electrical interface 132 of the consumable 118 are configured to contact each other and thereby electrically couple the adapter portion 120 to the consumable 118 when an end of the consumable 118 is engaged with an end of the smoking substitute device 102'. In this way, electrical energy (e.g., in the form of an electrical current) is able to be supplied from the connector 114 and auxiliary power source 122 of the smoking substitute device 102' to the vaporizer 106 of the consumable 118.

The vaporizer 106 is configured to heat and vaporize e-liquid contained in the tank 108 using electrical energy supplied from the connector 114 (and optionally supplemented by the auxiliary power source 122). As will be described further below, the vaporizer 106 includes a heating filament and a wick. The wick draws e-liquid from the tank 108 and the heating filament heats the e-liquid to vaporize the e-liquid.

The one or more air inlets 134 are configured to allow air to be drawn into the system 100', when a user inhales through the outlet 112 of the mouthpiece 110. When the consumable 118 is physically coupled to the smoking substitute device 102', air flows to the air inlets 134 along a gap between the adapter portion 120 and the consumable 118.

In operation, a user activates the system 100', e.g., through interaction with a user input forming part of the smoking substitute device 102' or by inhaling through the mouthpiece 110 as described above. Upon activation, the controller 124 may control the supply of electrical energy from the connector 114 (i.e., connected to a mobile device 104) to the vaporizer 106 (via electrical interfaces 128, 132), which may cause the vaporizer 106 to heat e-liquid drawn from the tank 108 to produce a vapor which is inhaled by a user through the outlet 112 of the mouthpiece 110.

An example of one of the one or more additional components 136 of the consumable 118 is an interface for providing an identifier of the consumable 118, such as any one or more of an RFID chip, a barcode or QR code, or memory within which is an identifier and which can be interrogated via an electronic interface in the smoking substitute device 102'.

It should be appreciated that the system 100' shown in FIGS. 3A and 3B is just one exemplary implementation of a smoking substitute system. As is depicted in FIG. 1, the smoking substitute device 102' and consumable 118 may instead be integrally formed so as to form a single-piece device.

Figure 4:
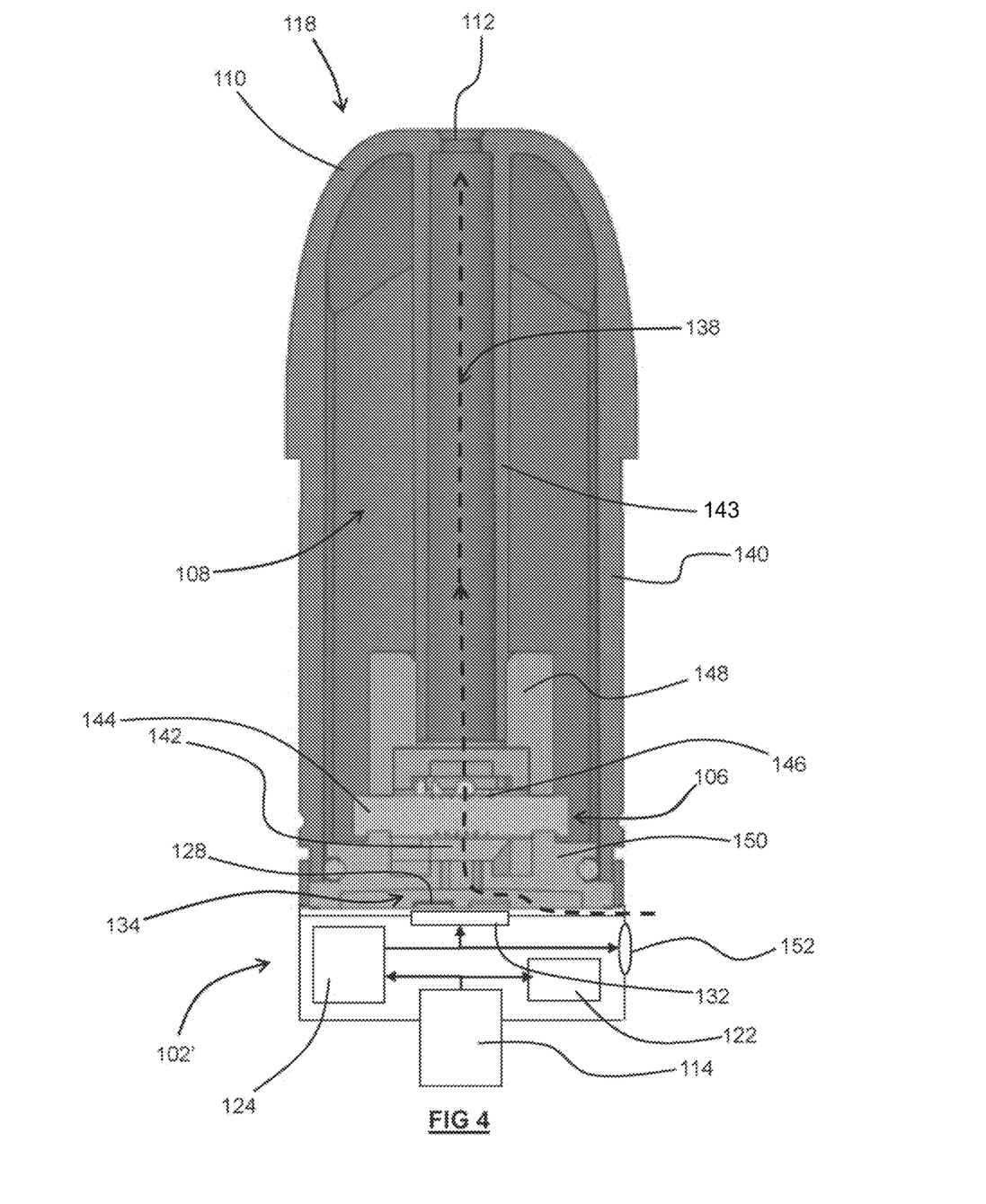
FIG. 4 is a section view of the second embodiment.

FIG. 4 is a section view of the system 100' described above. The consumable 118 comprises a tank 108 for storing e-liquid, a mouthpiece 110 and a passage 138 extending along a longitudinal axis of the consumable 118. In the illustrated embodiment the passage 138 is in the form of a tube having a substantially circular transverse cross-section (i.e., transverse to the longitudinal axis). The tank 108 surrounds the passage 138, such that the passage 138 extends centrally through the tank 108.

A tank housing 140 of the tank 106 defines an outer casing of the consumable 118, whilst a passage wall 143 defines the passage 140. The tank housing 140 extends from a lower end of the consumable 118 to the mouthpiece 110 at an opposing upper end of the consumable 118. The tank 108, the passage 138 and the mouthpiece 110 are integrally formed with each other so as to form a single unitary component and may, e.g., be formed by way of an injection moulding process. Such a component may be formed of a thermoplastic material such as polypropylene.

The mouthpiece 110 comprises an outlet 112 of the passage 138. The vaporizer 106 is fluidly connected to the outlet 110 and is located in a vaporizing chamber 142 of the consumable 118. The vaporizing chamber 142 is downstream of the inlet 134 of the consumable portion 118 and is fluidly connected to the outlet 110 by the passage 138.

The vaporizer 106 comprises a porous wick 144 and a heating filament 146 coiled around the porous wick 144. The wick 144 extends transversely across the chamber vaporizing 142 between sidewalls of the chamber 142 which form part of an inner sleeve 148 of an insert 150 that defines the lower end of the consumable 118.

The insert 150 is inserted into an open lower end of the tank 108 so as to seal against the tank housing 140. In this way, the inner sleeve 148 projects into the tank 108 and seals with the passage 138 so as to separate the vaporizing chamber 142 from the e-liquid in the tank 108. Ends of the wick 144 project through apertures in the inner sleeve 148 and into the tank 108 so as to be in contact with the e-liquid in the tank 108. In this way, e-liquid is transported along the wick 144 (e.g., by capillary action) to a central portion of the wick 144 that is exposed to airflow through the vaporizing chamber 142. The transported e-liquid is heated by the heating filament 146 (when activated, e.g., by detection of inhalation), which causes the e-liquid to be vaporized and to be entrained in air flowing past the wick 144. This vaporized liquid may cool to form an aerosol in the passage 138, which may then be inhaled by a user.

The heating filament 146 is electrically connected to an electrical interface 128 (in the form of electrical contacts) of the consumable 118. This electrical interface 128 is in contact with the electrical interface 132 of the smoking substitute device 102' (which is shown schematically for clarity). As is apparent from FIG. 4, this allows a main power supply from the connector 114 to be supplied to the consumable 118 (and, specifically, the heating filament 146). The main power supply to the consumable 118 is controlled by the controller 124, which may, for example, only permit supply of power upon determining that inhalation is occurring (e.g., via a puff sensor that is not shown).

The controller 124 also controls the auxiliary power supply from the auxiliary power source 122. In some embodiments the auxiliary power supply is provided to the heating filament 146 to supplement the main power supply. In the illustrated embodiment, the auxiliary power supply is supplied to an LED 152 of the smoking substitute device 102' for indicating a condition of the system 100'.

As has previously discussed, the auxiliary power source 122 is in the form of a rechargeable battery. In order to recharge the auxiliary power source 122, the controller 124 is configured to redirect the main power supply (from the connector 114, when connected to a mobile device 104) to the auxiliary power source 122 when the heating filament 146 is in an inactive (i.e., non-heating) state.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the"

include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein refer to embodiments of the disclosure that may provide certain benefits under some circumstances. It is to be appreciated, however, that other embodiments may also be preferred under the same or different circumstances. The recitation of one or more preferred embodiments therefore does not mean or imply that other embodiments are not useful, and is not intended to exclude other embodiments from the scope of the disclosure, or from the scope of the claims.

What is claimed is:

1. A smoking substitute system comprising:
    a vaporiser for vaporising an aerosol precursor, the vaporiser comprising a heating element;
    a connector configured to receive a main power supply from a mobile device and to supply the main power supply to the heating element of the vaporiser; and
    an auxiliary power source configured to provide an auxiliary power supply to at least one auxiliary component of the smoking substitute system, wherein the auxiliary power source is not connectable to the heating element.

2. The smoking substitute system according to claim 1, wherein the vaporiser comprises a wick in fluid communication with the aerosol precursor and the heating element is a heating filament electrically connectable to the connector.

3. The smoking substitute system according to claim 1, wherein the at least one auxiliary component is an LED.

4. The smoking substitute system according to claim 1, wherein the at least one auxiliary component is a controller configured to control power supply to the vaporiser.

5. The smoking substitute system according to claim 1 wherein the auxiliary power source is a supercapacitor or a rechargeable battery.

6. The smoking substitute system according to claim 5 wherein the auxiliary power source is electrically connected to the connector for receipt of at least a portion of the main power supply from the connector.

7. The smoking substitute system according to claim 6 wherein the rechargeable battery has a capacity of less than 100 mAh.

8. The smoking substitute system according to claim 5 wherein the rechargeable battery has a capacity of less than 100 mAh.

9. The smoking substitute system according to claim 1 wherein the auxiliary power source is configured so as to have a maximum discharge current capacity that is less than 0.5 A.

10. The smoking substitute system according to claim 1 wherein the connector comprises a USB-C connector.

11. The smoking substitute system according to claim 1 comprising:
    a smoking substitute device comprising the connector and the auxiliary power source; and
    a consumable comprising the vaporiser, a consumable portion engageable with an adapter portion such that, when engaged, the vaporiser is electrically connected to the connector of the smoking substitute device.

12. The smoking substitute system according to claim 1 comprising a mobile device.

* * * * *